United States Patent [19]

Collica et al.

[11] 4,056,729
[45] Nov. 1, 1977

[54] APPARATUS FOR HOUSING RADIATION MEASURING MATERIAL HOUSED IN A PLASTIC INSERT

[75] Inventors: Carl Collica, New Rochelle; Leonard Epifano, Rye; Ralph Farella, Scarsdale, all of N.Y.

[73] Assignee: Medi-Ray, Inc., Tuckahoe, N.Y.

[21] Appl. No.: 543,337

[22] Filed: Jan. 23, 1975

[51] Int. Cl.² .......................................... G01T 1/04
[52] U.S. Cl. ................................................ 250/472
[58] Field of Search .............. 250/337, 481, 474, 475, 250/476, 477, 479, 483, 484, 485, 439, 444, 472; 229/2.5 EC, 2.5; 40/10 R, 10 P, 1.5; 206/.84

[56] References Cited

U.S. PATENT DOCUMENTS

| | | | |
|---|---|---|---|
| 3,174,039 | 3/1965 | Frede et al. | 250/477 |
| 3,283,153 | 11/1966 | Geiger | 250/475 |
| 3,655,975 | 4/1972 | Evans | 250/475 |
| 3,792,277 | 2/1974 | Kamashita et al. | 250/337 |

Primary Examiner—Alfred E. Smith
Assistant Examiner—David K. Moore
Attorney, Agent, or Firm—Martin Novack

[57] ABSTRACT

An apparatus for housing radiation measuring material. First and second members having generally flat and opposing surfaces are provided, the members being joined with their surfaces in spaced relationship. The first surface has a plurality of circular recessed areas. The second surface has a plurality of recessed areas positionally aligned with the plurality of recessed areas in the first surface. A generally flat insert member is provided, the insert member proportioned to removably fit between the surfaces. The insert member has a plurality of circular apertures positionally aligned with the recessed areas, the apertures being adapted to removably receive and retain dosimetry discs. The recessed areas in the first and second surfaces are adapted to removably receive filter elements. The apparatus can be used for housing many of the various types of commercially available radiation measuring material.

9 Claims, 5 Drawing Figures

APPARATUS FOR HOUSING RADIATION MEASURING MATERIAL HOUSED IN A PLASTIC INSERT

BACKGROUND OF THE INVENTION

This invention relates to the field of dosimetry and, more particularly, to an apparatus for housing radiation measuring material, the apparatus preferably being in the form of a badge.

It is well recognized that in most installations where ionizing radiation is present it is necessary to periodically evaluate the amount of radiation dosage received by the bodies and specific body organs of personnel working in the radiation installation. The International Committee On Radiation Protection has established standards for persons occupationally exposed to radiation and the monitoring of dangerous radiation is required by law. Typically, all personnel wear a badge which contains radiation measuring material, and the badges are periodically examined, for example on a weekly or monthly basis, to determine the cumulative dosage of radiation received by the wearer's body or particular organs of the wearer's body.

Two commonly used techniques employ badges which contain photographic film in a filter pack and badges which contain thermal luminescence dosimeters ("TLD"). When photographic film is used, the film is sandwiched between filter elements and housed in a badge, typically a plastic container. After the badge has been worn for a period of time, is is processed by measuring the degree of film exposure against known standards. TLD badges, which employ dosimetry material such as lithium fluoride, emit light after heating, the quantity of light being proportional to the amount of radiation to which the material has been exposed. Special filters can be employed in conjunction with the TLD material in order to simulate the doses of radiation "seen" by specific organs or bones.

There are a variety of commercially available small film packages and TLD materials that can be incorporated in a badge, but it is found that different types of badges are needed depending on the configuration of the particular dosimeter media being utilized. For example, the photographic film is typically available in a rectangular package that must be housed in the badge. The TLD detectors are typically available in the form of small thin discs. Often, it is necessary or desirable to use filter discs on both sides of a TLD disc and a problem of convenience arises in forming the necessary sandwich, especially when convenient disassembly is also desired. Still another type of TLD detector is commercially available in rectangular shape and having one or more active areas of TLD material thereon, and this item may be used with or without filter elements. A number of different types of badges are available which can house the listed materials with varying degrees of efficiency and convenience. However, to applicant's knowledge, there is no single badge housing unit that is suitable for the available variety of different detector materials which does not have significant operational disadvantage.

It is an object of this invention to provide a badge for housing radiation measuring material, the badge being capable of conveniently housing various types of commercially available detection devices and facilitating easy assembly and disassembly.

SUMMARY OF THE INVENTION

The present invention is directed to an apparatus for housing radiation measuring material, such as dosimetry devices. In accordance with the invention there are provided first and second members joinable in spaced relationship and having generally flat and parallel opposing surfaces. The first surface has a plurality of recessed areas. Further provided is a generally flat insert member proportioned to removably fit between the surfaces, the insert member having a plurality of receiving chambers positionally aligned with the recessed area. The chambers are adapted to removably receive radiation measuring material and the recessed areas are adapted to removably receive filtering material.

In a preferred embodiment of the invention, the second surface has a plurality of recessed areas positionally aligned with the plurality of recessed areas in the first surface. In this embodiment the receiving chambers in the insert members comprise apertures, the apertures being provided with means for retaining radiation measuring material.

The invented apparatus can have a number of types of commercially available dosimetry materials and filters and is readily adaptable to house a photographic film package. Also, it provides convenient assembly and disassembly and overall ease of operation.

Further features and advantages of the invention will become more readily apparent from the following detailed description when taken in conjunction with the accompanying drawings.

DESCRIPTION OF THE PREFERRED EMBODIMENT

Figure 1:
FIG. 1 is a front elevational view of an apparatus in accordance with the invention.

Referring to FIG. 1, there is shown a front view of an apparatus 10 for housing radiation measuring material, the apparatus being in a form most suitable as a badge in the present embodiment. Typically, the face of the badge will contain identification information such as the name of the wearer or a designated badge number, etc. In the present embodiment the badge face has an aperture 11 through which is visible a colored material 12 which may typically identify a specific monitoring time period (such as a particular week or month) by color code. In FIG. 1 the badge is assembled and includes the desired radiation measuring materials and can be provided, for example, with a back clip (not shown) suitable for attaching the badge to a wearer's clothing. It will be understood, however, that the apparatus of the present invention need not necessarily be employed as a badge to be worn on clothing or a wrist band, although this is its preferred form.

Figure 2:
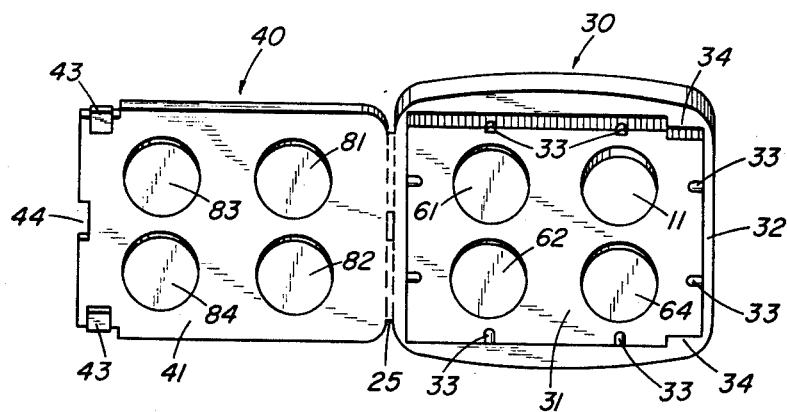
FIG. 2 is an elevational perspective view of the apparatus of FIG. 1 in an opened position and with its insert member removed.

In the present embodiment the badge 10 includes first and second members, designated by reference numerals 30 and 40, as is shown in FIG. 2. The member 30 serves on one side as the face of the badge, its back side being visible in the illustration of FIG. 2. Also, in this embodiment, the second member, 40, is joined to the member 30 in foldable fashion, such that the member 40 can open and close in the manner of a compact compartment door on the member 30. In this embodiment the members 30 and 40 are formed of an integral piece of plastic material and joined by a "living hinge" 25 which comprises a section of flexible plastic that can be formed during molding in known manner. When the badge is fully assembled, the inner surfaces 31 and 41 of members 30 and 40, respectively, are parallel opposing surfaces. The member 30 has a side rim 32 which envelopes the member 40 in the assembled position, as can be seen from the illustration of FIG. 5. A plurality of nubs 33 serve to maintain the opposing surfaces 31 and 41 in a fixed space relationship, notwithstanding the presence or absence of media between these surfaces. The rim 32 is provided with small flanges 34 which capture a pair of tabs 43 of the member 40 and retain the members in a folded relationship. An indentation 44 in the member 40 allows insertion of a small key (not shown) for opening the folded badge. When assembled, the badges are not intended to be readily opened by wearers, so a "key", or any thin flat object, can be employed by the person providing the monitoring service who is commissioned with loading and unloading the badges.

The surface 41, which is generally flat, includes four substantially circular recesses designated 81, 82, 83 and 84. The surface 31, also generally flat, includes the circular aperture 11 and circular recessed areas labeled 61, 62 and 64. The recesses in the two surfaces are positionally aligned; i.e., with the badge in the assembled or closed position the recesses 61, 62 and 64 are aligned with the recesses 81, 82 and 84. Also, the recess 83, which is not strictly necessary, is aligned with aperture 11.

Figure 4:
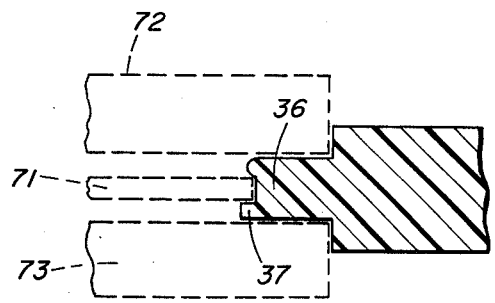
FIG. 4 is a cross-section taken through a section of the insert member of FIG. 3, the cross-section being defined by arrows 4—4 of FIG. 3.

It will be recognized, and become clearer hereinbelow, that the illustration of FIG. 2 shows the blank members 30 and 40 while the cross-section of FIG. 4 shows the badge 10 assembled with an insert 35 in accordance with the invention as well as filter materials and radiation measuring discs.

Figure 3:
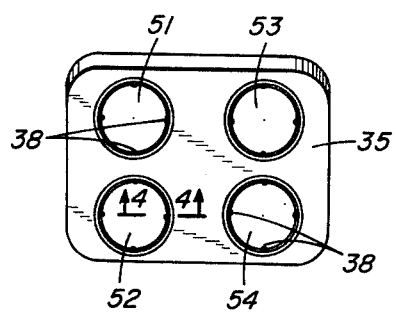
FIG. 3 is an elevational perspective view of an insert member in accordance with an embodiment of the invention.

Referring to FIG. 3, there is shown an embodiment of an insert member 35 which is proportioned to removably fit between the surfaces 31 and 41, the insert position being defined by the nubs 33 (FIG. 2). In this embodiment the insert 35 is a generally flat rectangular plastic piece having four chambers labeled 51, 52, 53 and 54. The chambers are proportioned and adapted to removably receive discs of radiation measuring material, such as commercially available TLD discs. In this embodiment each of the chambers comprises an aperture in the insert member 35. The apertures have peripheries illustrated by the enlarged cross-section of FIG. 4. Specifically, the insert 35 narrows to an annular portion 36 which, in turn, narrows further to an annular flange 37. The annular flange 37, in conjunction with four small protrusions 38 (FIG. 3), serves to retain a standard sized disc of radiation measuring material, such as a TLD disc, which is represented in FIG. 4 by the dotted section 71 as will be seen in further detail in FIG. 5. The TLD disc can be readily snapped into or out of the aperture. Filter discs, represented by the dotted sections 72 and 73 in FIG. 4, conveniently fit against the annular portion 36.

Figure 5:
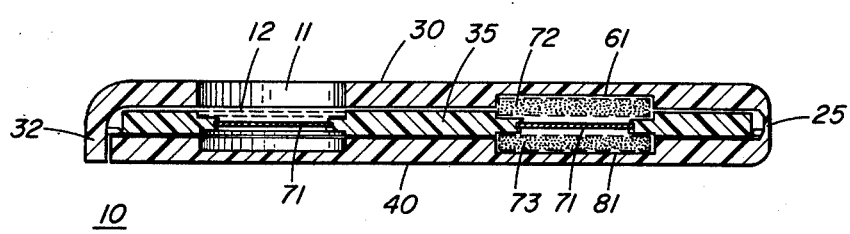
FIG. 5 is a cross-sectional view, as taken through a section defined by arrows 5—5 of FIG. 1, of an apparatus in accordance with the invention.

FIG. 5 is helpful in illustrating the configuration of the invented apparatus when housing radiation measuring materials and auxiliary materials. Discs 71 of radiation measuring material are mounted in the insert member 35, this typically being done before insertion of the member 35 between the members 30 and 40. Filter elements 72 and 73 are shown as positioned in the circular recesses 61 and 81, respectively. The filters 72 and 73 might typically be different from filter pairs employed in the other two aligned circular recesses for the purpose of providing different degrees of filtering to simulate the exposure of different body organs or bones. The disc 71 measures direct radiation and need not be provided with filter elements. The plastic disc 12 (see also FIG. 1) can provide color coding or other information.

It will be recognized that the invention facilitates the housing of radiation measuring materials, such as TLD discs and filters and renders the loading and unloading of same in the badge a simple task. Also, a film pack or a rectangularly shaped TLD package can be utilized in place of the insert 35, or other substitutions can be made as desired.

The invention has been described with reference to a particular embodiment, but variations within the spirit and scope of the invention will occur to those skilled in the art. For example, the members 30 and 40 could be joined in alternate ways and the insert member could be provided with alternative retaining means.

We claim:

1. Apparatus for housing radiation measuring material, comprising, in combination, first and second members joinable in spaced relationship and having generally flat and parallel opposing surfaces; said surface of said first member having a plurality of recessed areas; and a generally flat insert member proportioned to removably fit between said surfaces said insert member having a plurality of receiving chambers positionally aligned with said recessed areas, said chambers being adapted to removably receive radiation measuring material.

2. The apparatus as defined by claim 1 wherein said surface of said second member has a plurality of recessed areas positionally aligned with the plurality of recessed areas in said surface of said first member.

3. An apparatus as defined by claim 2 wherein said receiving chambers comprise apertures in said insert member.

4. An apparatus as defined by claim 2 further comprising an aperture in said surface of said first member positionally aligned with a recessed area in said surface of said second member.

5. An apparatus for housing radiation measuring material comprising in combination:
    first and second members having generally flat and parallel opposing surfaces;
    means for joining said members with said surfaces in spaced relationship;
    said surface of said first member having a plurality of substantially circular recessed areas; and
    said surface of said second member having a plurality of recessed areas positionally aligned with the plurality of recessed areas in said surface of said first member; and a generally flat insert member proportioned to removeably fit between said surfaces, said insert member having a plurality of receiving chambers positionally aligned with a said chamber areas, said chambers being adapted to removeably receive radiation measuring material.

6. An apparatus as defined by claim 5 and further comprising a generally flat insert member proportioned to removably fit between said surfaces, said insert having a plurality of substantially circular apertures positionally aligned with said recessed areas, said apertures being adapted to removably receive and retain dosimetry discs.

7. An apparatus as defined by claim 6 wherein said receiving chambers comprise apertures in said insert member.

8. An apparatus as defined in claim 6 wherein said first and second members are joined at respective edges and foldable on one another.

9. An apparatus as defined by claim 8 wherein said first and second members are formed of an integral piece of plastic.

* * * * *